United States Patent [19]
White

[11] Patent Number: 5,949,056
[45] Date of Patent: Sep. 7, 1999

[54] METHOD AND APPARATUS FOR OPTICALLY READING AN INFORMATION PATTERN

[75] Inventor: Jonathan R. White, Cedar Rapids, Iowa

[73] Assignee: Norand Corporation, Cedar Rapids, Iowa

[21] Appl. No.: 08/561,991

[22] Filed: Nov. 22, 1995

Related U.S. Application Data

[60] Division of application No. 08/215,115, Mar. 17, 1994, abandoned, and a continuation-in-part of application No. 07/965,983, Oct. 23, 1992, abandoned, and a continuation of application No. 07/960,520, Oct. 13, 1992, abandoned, which is a continuation-in-part of application No. 07/912,917, Jul. 13, 1992, abandoned, which is a continuation-in-part of application No. 07/881,096, May 11, 1992, abandoned, which is a continuation-in-part of application No. 07/820,070, Jan. 10, 1992, abandoned, which is a continuation-in-part of application No. 07/786,802, Nov. 5, 1991, abandoned, which is a continuation-in-part of application No. 07/777,691, Oct. 10, 1991, abandoned, which is a continuation-in-part of application No. 07/735,610, Jul. 23, 1991, abandoned, which is a continuation-in-part of application No. 07/719,731, Jun. 24, 1991, abandoned, which is a continuation-in-part of application No. 07/674,756, Mar. 25, 1991, abandoned, which is a continuation-in-part of application No. 07/467,096, Jan. 18, 1990, Pat. No. 5,052,020, application No. PCT/US90/03282, Jun. 7, 1990, and application No. 07/660,615, Feb. 25, 1991, Pat. No. 5,218,187, which is a continuation-in-part of application No. 07/633,500, Dec. 26, 1990, Pat. No. 5,202,817, which is a continuation-in-part of application No. 07/561,994, Jul. 31, 1990, abandoned, which is a continuation-in-part of application No. 07/558,895, Jul. 25, 1990, abandoned, which is a continuation-in-part of application No. 07/426,135, Oct. 24, 1989, Pat. No. 5,218,188, which is a continuation-in-part of application No. 07/347,849, May 3, 1989, abandoned, which is a continuation-in-part of application No. 07/347,602, May 3, 1989, abandoned, which is a continuation-in-part of application No. 07/345,200, Apr. 28, 1989, abandoned, which is a continuation-in-part of application No. 07/305,302, Jan. 31, 1989, abandoned, said application No. 07/965,983, is a continuation of application No. 07/719,731, Jun. 24, 1991, abandoned, which is a continuation-in-part of application No. 07/441,007, Nov. 21, 1989, abandoned, which is a continuation-in-part of application No. 06/905,779, Sep. 10, 1986, Pat. No. 4,882,476, said application No. 08/215,115, is a continuation of application No. 07/987,574, Dec. 8, 1992, Pat. No. 5,313,053, which is a continuation of application No. 07/674,756.

[51] Int. Cl.$^6$ .................................................. G06K 7/10
[52] U.S. Cl. ............................... 235/472.01; 235/462.22
[58] Field of Search ............................. 235/472, 462.22, 235/472.01

[56] References Cited

U.S. PATENT DOCUMENTS 3,976,973  8/1976  Martin et al. .
4,207,527  6/1980  Abt .

(List continued on next page.)

*Primary Examiner*—Harold I. Pitts
*Attorney, Agent, or Firm*—Suiter & Associates PC

[57] ABSTRACT

A portable, hand-held data terminal of modular structure includes a base module with a keyboard and a display screen. A data collection and communications module includes a stacked arrangement of a communications interface main circuit board, a radio and a laser scanner assembly which are housed in a housing shell which is attachable to the base module. The radio is mounted in spaced relationship to one side of the main circuit board, while the laser scanner assembly is mounted to the other side of the main circuit board. A support frame and a plurality of ground planes in the sandwiched main circuit board and a routing circuit board form an RF cage for shielding RF interference which may be generated by the radio. Also disclosed is a method for reducing the operational power consumption requirements of laser bar code scanners by analyzing reflected laser light in order to determine the presence of optically readable information sets. In a first embodiment, the reflected light intensity of a pulsed laser light beam is compared to the ambient light intensity to provide a control signal to actuate the scanning mode if a threshold differential is satisfied. In a second embodiment, a modulated laser light pulse is filtered to remove ambient light noise and then provides a control signal to actuate the scanning mode if a threshold value is reached.

5 Claims, 6 Drawing Sheets

U.S. PATENT DOCUMENTS

| | | |
|---|---|---|
| 4,385,285 | 5/1983 | Horst et al. . |
| 4,418,277 | 11/1983 | Tremmel et al. . |
| 4,461,292 | 7/1984 | Tunnell et al. . |
| 4,540,897 | 9/1985 | Takaoka et al. . |
| 4,556,983 | 12/1985 | Heitmann et al. . |
| 4,560,862 | 12/1985 | Eastman et al. . |
| 4,569,421 | 2/1986 | Sandstedt . |
| 4,584,690 | 4/1986 | Cafiero et al. . |
| 4,628,193 | 12/1986 | Blum . |
| 4,727,245 | 2/1988 | Dobbins et al. . |
| 4,749,353 | 6/1988 | Breedlove . |
| 4,785,717 | 11/1988 | Rocholl et al. . |
| 4,820,911 | 4/1989 | Arackellian et al. . |
| 4,831,275 | 5/1989 | Drucker . |
| 4,841,129 | 6/1989 | Tawara et al. . |
| 4,850,009 | 7/1989 | Zook et al. . |
| 4,857,716 | 8/1989 | Gombrich et al. . |
| 4,877,949 | 10/1989 | Danielson et al. . |
| 4,882,476 | 11/1989 | White . |
| 4,897,532 | 1/1990 | Swartz et al. . |
| 4,897,857 | 1/1990 | Wakatsuki et al. . |
| 4,902,883 | 2/1990 | Poland . |
| 4,910,753 | 3/1990 | Wakatsuki et al. . |
| 4,933,538 | 6/1990 | Heiman et al. . |
| 4,984,881 | 1/1991 | Osada et al. . |
| 5,052,020 | 9/1991 | Koenck et al. . |
| 5,055,660 | 10/1991 | Bertagna et al. . |
| 5,107,100 | 4/1992 | Shepard et al. . |
| 5,313,053 | 5/1994 | Koenck et al. . |
| 5,420,411 | 5/1995 | Salatto et al. . |

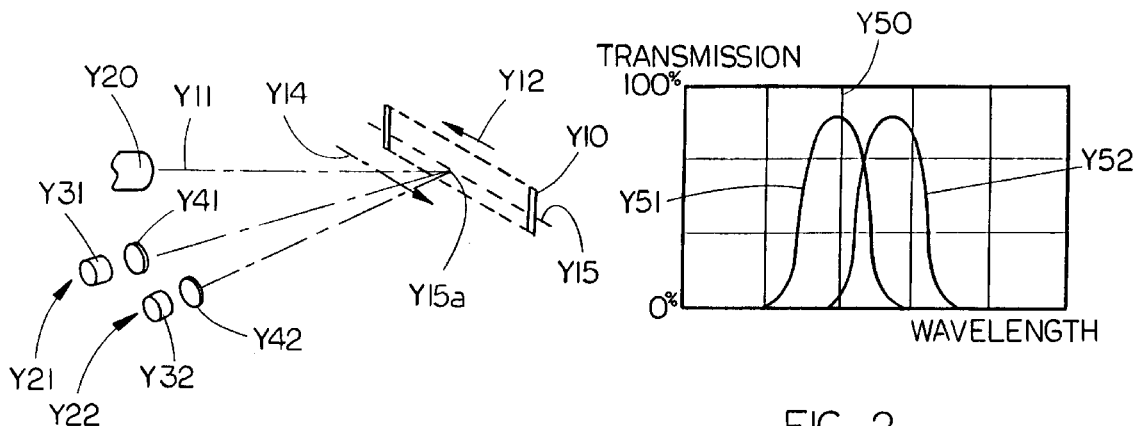
FIG. 1
FIG. 2
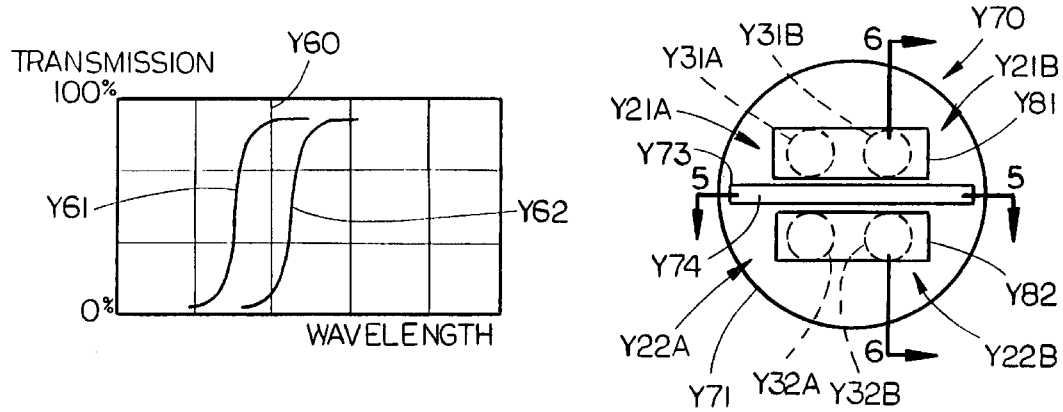
FIG. 3
FIG. 4
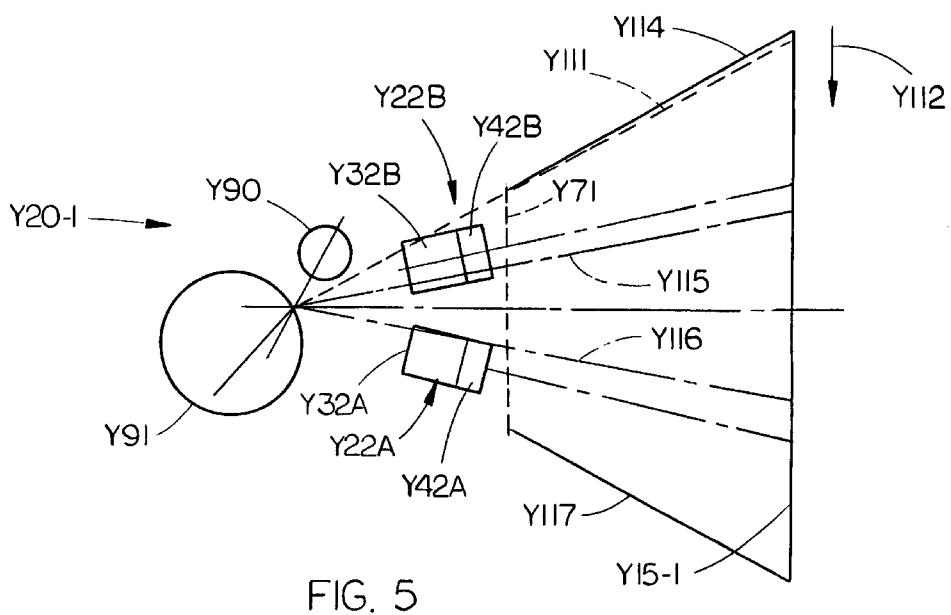
FIG. 5 ial application PCT/US90/03282, filed

METHOD AND APPARATUS FOR OPTICALLY READING AN INFORMATION PATTERN

CROSS REFERENCES TO RELATED APPLICATIONS

Claiming Benefit Under 35 U.S.C. 120

The present application is Division of Ser. No. 08/215,115 Mar. 17, 1994, abandoned which is a continuation of U.S. Ser. No. 07/987,574, filed Dec. 8, 1992, now U.S. Pat. No. 5,313,053, issued May 17, 1994, which is a continuation of U.S. Ser. No. 07/674,756, filed Mar. 25, 1991, now abandoned, which is a continuation-in-part application of U.S. Ser. Nos. 07/660,615, filed Feb. 25, 1991, now U.S. Pat. No. 5,218,187, issued Jun. 8, 1993, 07/467,096, filed Jan. 18, 1990, now U.S. Pat. No. 5,052,020, issued Sep. 24, 1991, and PCT international application PCT/US90/03282, filed Jun. 7, 1990. Said PCT international application entered the national stage under Ser. No. 07/777,393 with a 35 U.S.C. 371 date of Jan. 7, 1992 and with a 35 U.S.C. 102(e) date of Jan. 7, 1992, and issued as U.S. Pat. No. 5,410,141 on Apr. 25, 1995.

The present application is also a continuation-in-part of U.S. Ser. No. 07/965,983, filed Oct. 23, 1992, now abandoned, which is a continuation of U.S. Ser. No. 07/719,731, filed Jun. 24, 1991, now abandoned, which is a continuation-in-part of U.S. Ser. No. 07/441,007, filed Nov. 21, 1989, now abandoned, which is a continuation-in-part of U.S. Ser. No. 06/905,779, filed Sep. 10, 1986, now U.S. Pat. No. 4,882,476, issued Nov. 21, 1989. The disclosures of these applications are incorporated herein by reference.

The present application is also a continuation of U.S. Ser. No. 07/960,520, filed Oct. 13, 1992, now abandoned, which is a continuation-in-part of U.S. Ser. No. 07/912,917, filed on Jul. 13, 1992, now abandoned, which is a continuation-in-part of U.S. Ser. No. 07/881,096, filed on May 11, 1992, now abandoned, which is a continuation-in-part of U.S. Ser. No. 07/820,070, filed Jan. 10, 1992, now abandoned, which is a continuation-in-part of U.S. Ser. No. 07/786,802, filed Nov. 5, 1991, now abandoned, which is a continuation-in-part of U.S. Ser. No. 07/777,691, filed Oct. 10, 1991, now abandoned, which is a continuation-in-part of U.S. Ser. No. 07/735,610, filed Jul. 23,1991, now abandoned, which is a continuation-in-part of U.S. Ser. No. 07/719,731, filed Jun. 24, 1991, now abandoned, which is a continuation-in-part of U.S. Ser. No. 07/674,756, filed Mar. 25, 1991, now abandoned, which is a continuation-in-part of U.S. Ser. No. 07/660,615, filed Feb. 25 1991, now U.S. Pat. No. 5,218, 187, issued Jun. 8, 1993, which is a continuation-in-part of U.S. Ser. No. 07/633,500, filed Dec. 26, 1990, now U.S. Pat. No. 5,202,817, issued Apr. 13, 1993, which is a continuation-in-part of U.S. Ser. No. 07/561,994, filed Jul. 31, 1990, now abandoned, which is a continuation-in-part of U.S. Ser. No. 07/558,895, filed Jul. 25, 1990, now abandoned, which is a continuation-in-part of U.S. Ser. No. 07/426,135, filed Oct. 24, 1989, now U.S. Pat. No. 5,218, 188, issued Jun. 8, 1993, which is a continuation-in-part of U.S. Ser. No. 07/347,849, filed May 3, 1989, now abandoned, which is a continuation-in-part of U.S. Ser. No. 07/347,602, filed on May 3, 1989, now abandoned, which is a continuation-in-part of U.S. Ser. No. 07/345,200, filed Apr. 28, 1989, now abandoned, which is a continuation-in-part of U.S. Ser. No. 07/305,302, filed Jan. 31, 1989, now abandoned.

BACKGROUND OF THE INVENTION

This invention relates generally to data collection and processing systems using portable, hand-held data terminals for collecting data, and for selectively processing and communicating collected data to other system elements. More particularly, the invention relates to collection apparatus of such hand-held data terminals. Typical collection processes may include reading data and manually keying in such read data. The present invention relates particularly to apparatus for reading data into the terminal. Known automated reading processes are executed by apparatus which includes scanning readers, for example.

In efforts to adapt data collection terminals to a wider scope of uses, terminals with increased ruggedness over state of the art terminals are bringing advances to the art. However, the usefulness of the data collection terminals may also be increased by further reducing the weight and size of the data collection terminals to sizes and weights below the present lower limits of state of the art terminals. Typically a reduction in size might result in the elimination of at least some desirable features. The use of modular data collection terminals would support the reduction in non-essential features to achieve certain reduction in size and weight.

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the fields of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g. the provision of an optical scanner tip which may be used for data communication. However, pin and socket type connectors may be utilized.

In connection with the use of portable data systems it is conceived that it would be highly advantageous to be able to readily upgrade a basic hand-held terminal to incorporate bar code scan type readers and various image readers as they are progressively improved and developed. A particular goal would be the implementation of the auxiliary image reader function in a rugged configuration free of moving parts. However, in the case of autofocus readers, the current state of the art may require dynamic components for the sake of optimum compactness and economy.

SUMMARY OF THE INVENTION

A laser scanner may be added to a data collection terminal unit which typically features a radio frequency transceiver module.

In accordance with particular features of the invention, a radio transceiver and a laser scanner are integrated into a single module with only a minimal increase in volume over the volume of a radio transceiver module without the laser scanner unit.

According to another aspect of the invention, rotatively mounted scanning mirrors of a laser scanner are formed about magnetic poles of an armature of a motor for rotating the mirrors.

In accordance with another feature of the invention, electronic elements and physical elements for implementing functions of a laser scanner of the hand-held data collection terminal and electronic coupling circuits for interconnecting the laser scanner with the data collection terminal are disposed in interleaved relationship with electronic components for processing communications between a transceiver and the laser scanner.

Various other features and advantages of the data terminal in accordance with the invention will become apparent from the following detailed description, which may be best understood when read with reference to the appended drawings.

Accordingly, it is an important object of the present invention to provide a portable data system wherein technologically advanced image reader devices can be readily accommodated.

In a presently preferred configuration particularly suited for forklift truck applications and the like, a portable data terminal with a rugged surface contact configuration accommodates supply of power by the vehicle when the terminal is placed in a vehicle mount; further, the terminal batteries may receive charge while the terminal is operating from the vehicle power so that full battery capacity is available when portable operation is required. However, other contact means might also be utilized.

In accordance with a further development of the invention, portable terminals, for example, may be quickly removed from the charging system by grasping of the terminal itself followed by a simple lifting extraction.

In accordance with an important aspect of the present invention, a docking apparatus removably receives portable data terminal and code reader means for purposes of data communication, e.g., with a host computer and/or for the recharging of rechargeable batteries. In one potential embodiment the terminal and reader means may have electrical contact pad means generally flush on their exterior. In such an embodiment, an abutting type engagement between the contact pad means and cooperating electrical contact means of the docking apparatus may be used for transmitting charging current such that the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have, e.g., twelve external contact pads and be intended for interfacing only with systems having provision for open abutment type interconnection.

The terminal and/or reader receptacle means is preferably arranged so that with the terminal or reader secured therein, each line of the display remains visually observable in a convenient orientation relative to a driver of a vehicle. Also all of the key positions of the keyboard are manually accessible, the legends on the keyboard having an orientation so as to be conveniently readable, e.g. by the driver of the vehicle. In particular the axis of each line of the display and of each row of key positions should be generally horizontal (rather than vertical) and the alphanumeric characters of the display and keyboard legends should be upright (rather than inverted) as viewed by the operator.

Also most preferably the terminal or reader can be inserted into the receptacle with one hand and is securely retained. Ideally the terminal or reader is automatically secured with a snap type action which is perceptible, e.g., audibly and tactually to the operator.

In some instances a resilient bias may serve to firmly position the terminal or reader for steady reliable electrical contact at each abutting type contact position in spite of vehicle jarring and vibration or the like. For enhanced security of retention with the docking apparatus, e.g. in mobile applications, the terminal or reader may be automatically affirmatively retained in its receptacle e.g. by means of a detent type action.

One exemplary embodiment of data capture terminal unit is provided with a plurality of electrically conductive pads generally coplanar with the external surface of the housing. Such electrically conductive pads may be interconnected by internal circuitry to the connector elements of a D-style connector mounted upon the housing end cap such that recharge power and data communication pathways may be made through either or both of the connector means. The electrically conductive pads are positioned such that they may be engaged with mating elements having sufficient resilience to maintain stable electrical contact therebetween while the terminal is in a docking receptacle or the like.

According to another aspect of the invention, a laser light source may provide simultaneous illumination of a complete image line or a complete image column, or a substantial linear segment thereof, facilitating the achievement of a rugged image reader unit preferably without moving parts in the illumination system. In a further development a long range CCD image reader having auto-focus capabilities may be utilized with a fan beam for simultaneously illuminating a complete image line over a substantial range of distances.

Various other features and advantages of the data terminal in accordance with the invention will become apparent from the following detailed description, which may be best understood when read with reference to the appended drawings.

BRIEF DESCRIPTION OF THE DRAWINGS

FIG. 1 is a diagrammatic illustration of a laser bar code reader system in accordance with the present invention;

FIG. 2 is a graphical illustration for explaining one embodiment of filter means for use in FIG. 1;

FIG. 3 illustrates another embodiment of filter means for use in FIG. 1;

FIG. 4 is a diagrammatic end elevational view of a laser bar code scanner unit wherein the laser beam is to be swept over an extended scanning path to read a relatively wide bar code label;

FIG. 5 is a somewhat diagrammatic view taken generally along the line V–V of FIG. 4;

DETAILED DESCRIPTION OF THE INVENTION

Description of FIGS. 1–16

Figure 6:
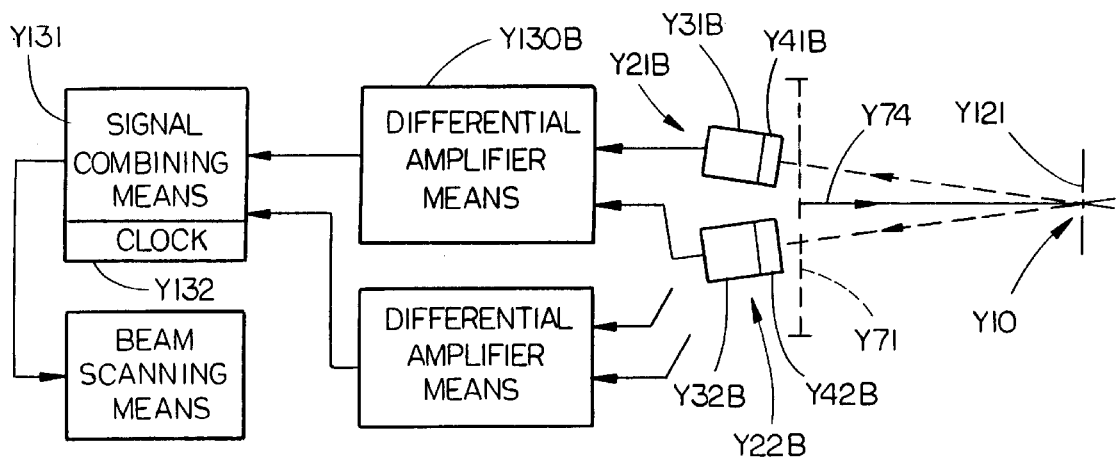
FIG. 6 is a diagrammatic view taken generally along the line VI–VI in FIG. 4 and indicating exemplary electronic circuitry for association with the swept laser beam scanner embodiment of FIGS. 4, 5 and 6.

FIG. 1 is intended as a generic illustration wherein scanning of a bar code label Y10 takes place by relative movement between a laser beam indicated at Y11 and the bar code label Y10. For example, the label may be moved in a longitudinal direction as indicated by arrow Y12, or the laser beam may be moved in a scanning direction such as indicated at Y14 for impingement on successive points along a scanning path such as indicated at Y15.

By way of example, a laser light source is indicated at Y20 and respective light detectors Y21 and Y22 are shown for receiving reflected light produced by the beam Y11 at each successive point along the scanning path Y15. By way of example, detectors Y21 and Y22 may be fixedly secured in a housing with the laser source Y20 so as to be focused at a common point such as indicated at Y15a at a suitable distance from an end face of the housing. In one type of embodiment with common point focus, the label Y10 may be moved longitudinally as indicated at Y12 so as to effect sequential scanning of the complete bar code. In another example, the housing itself may be moved in the direction of arrow Y14 so that the complete bar code is sequentially scanned. In a further example, laser light source Y20 and detectors Y21 and Y22 may be pivotally mounted within the housing so as to jointly sweep along the scanning path Y15 so as to scan a complete bar code. In another type of a scanner, the laser light source Y20 is equipped with scanning means for causing the beam Y11 to scan along a scanning path such as indicated at Y15 at a selected distance from the housing, while detectors Y21 and Y22 are arranged to collect reflected light form each successive point along the scanning path Y15. Alternatively, the laser light source Y20 may be simultaneously illuminate the entire region Y15 and the detector means Y21 and Y22 may be pivotally mounted to sequentially scan successive points along the region Y15.

In a specific example in accordance with the present invention, detectors Y21 and Y22 comprise respective light sensors Y31 and Y32 which may be identical, and respective filters Y41 and Y42 which provide generally comparable response to sunlight but provide substantially different responses to the limited spectral band transmitted by the light source Y20, such that an enhanced sensitivity is provided by a differential between the outputs from sensors Y31 and Y32.

In the embodiment of FIG. 2, laser light source Y20 supplies a wavelength of light as indicated at Y50 and the filters Y41 and Y42 have bandpass spectral properties as indicated at Y51 and Y52.

In the embodiment of FIG. 3, the wavelength of the laser light source Y20 is indicated at Y60 and the broadband spectral transmission properties of the respective filters Y41 and Y42 are indicated at Y61 and Y62.

In each of the embodiments of FIGS. 2 and 3, the ordinate axis may represent transmission between zero percent and one hundred percent. In each case, the outputs from detectors Y21 and Y22 are preferably substantially balanced, that is of equal amplitude in the presence of sunlight alone, the differential in a transmission at the wavelength Y50 or Y60, being at least fifty percent in the examples of FIGS. 2 and 3.

In FIG. 4, there is indicated a scanner unit Y70 including a housing with an end face of Y71 which is arranged to confront a bar code label such as indicated at Y10 in FIG. 1 at a selected distance such as three or more inches. In the indicated example of FIG. 4, the laser beam may be scanned along the length of an elongated window indicated at Y73 and may effect scanning in a plane such as indicated at Y74 which would include the scanning path such as indicated at Y15 in FIG. 1.

In the exemplary embodiment of FIG. 4, an array of first and second light detectors is provided with the first detectors such as Y21A and Y21B and the second detectors such as Y22A and Y22B, being arranged in respective pairs such as Y21A, Y22A along the locus of reflected light produced by the scanning of the laser beam. For the example of two pairs as shown in FIG. 4, and for scanning of the laser beam from left to right as viewed in FIG. 4, during scanning of a left segment of the label, reflected light would predominately reach the detectors Y21A and Y22A. In a mid region of the label, reflected light would reach both pairs of detectors with comparable magnitude, and for a right-hand segment of the bar code label, the reflected light would predominately reach the right-hand pair of detectors Y21B, Y22B. For each point along the scanning path the reflected light reaching a first detector such as Y21A of a pair would be of substantially equal magnitude with the reflected light reaching the second detector such as Y22A of such pair.

In the specific example of FIG. 4, a common filter element Y81 having spectral characteristics as indicated at Y51 or Y61 may cover all of the first light sensors such as Y31A and Y31B of the array, while a common filter element Y82 having the spectral transmission properties Y52 or Y62 may be associated with the second light sensors of the array such as indicated at Y32A and Y32B. By way of example, window Y73 and filter elements Y81 and Y82 may form part of the end face Y71 of the housing of the laser bar code reader unit of FIG. 4, other portions of the end face Y71 being opaque, so that light may only enter or exit the housing through window Y73 and filter elements Y81 and Y82.

In FIG. 5, laser light source means Y20-1 is indicated as comprising a laser source Y90 and a suitable scanner system Y91 which may cause a laser beam Y111 of a wavelength such as indicated at Y50 or Y60 to be focused at a point along the scanning path Y15-1 and to scan along the path as indicated by arrow Y112. For beam positions between those indicated at Y114 and Y115, reflected light is predominately received by the pair Y21B, Y22B. For beam positions between Y115 and Y116, comparable amplitudes of reflected light may reach both pairs Y21B, Y22B and Y21A, Y22A, while for beam positions between Y116 and Y117, reflected light may be predominated at the pair of detectors Y21A, Y22A.

In the example of FIG. 5, each detector may have an individual filter element such a filter elements Y42A and Y42B associated with respective second light sensors Y32A and Y32B. In FIG. 5, end face Y71 may provide a common optical window for transmitting the laser beam Y111 at a region such as Y73, FIG. 4, and for admitting reflected light at regions such as indicted at Y81 and Y82 in FIG. 4.

As seen in FIG. 6, each pair of light detectors of the array, such as first and second detectors Y21B and Y22B are symmetrically arranged with respect to the plane Y74 of the scanning laser beam so that the paths for reflected light from each point such as indicated at Y121 along the scanning path Y15-1 to detectors Y21B and Y22B are equal. As in FIG. 5, each detector is shown as comprising a sensor such as Y31B, Y32B, and a filter element such as Y41 B, Y42B with respective spectral transmission properties as indicated in FIG. 2 or FIG. 3.

In each of the embodiments, as indicated in FIG. 6, the output of the detector or each detector pair such as Y21B, Y22B may be supplied to a differential amplifier means such as indicated at Y130A, Y130B. The outputs of the detector pair Y21A, Y22A may be supplied to the differential amplifier means Y130A and Y130B may be suitably combined either on an analog basis or on a digital basis to provide a resultant bar code signal to be decoded. By way of example, a clock Y132 may be connected with component Y131, and with a beam scanner control means Y133 may be constructed and operated so that component Y131 can determine the position of the beam Y111 with reference to the zones Y114-115, Y115-116, and Y116-117, respectively. For example component Y131 may supply pulses derived from clock pulses to component Y133 to drive the scanning operation. Alternatively, beam driving pulses may be generated at component Y133 and supplied also to component Y131.

It is contemplated that the present embodiments will provide a more reliable bar code reading with a given laser source and under natural and supplementary lighting conditions, and further may allow the use of a lower power laser light source, with many attendant benefits such as greater safety, better adaptability to portable (battery powered) and hand-held use, less heat to dissipate, and therefore expected longer life. A differential between the outputs of detectors such as indicated at Y21 and Y22 will provide superior noise rejection properties in comparison to a detector such as Y31 by itself. If necessary, a neutral density filter could be combined with one or the other of the filters such a Y41 and Y42 to balance the detector outputs under broadband illumination (e.g. sunlight).

Figure 7:
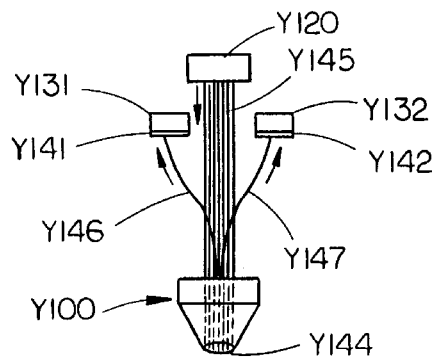
FIG. 7 illustrates a wand type bar code scanner in accordance with the present invention.

FIG. 7 shows a hand-held wand type scanner Y100 according to FIG. 2 or FIG. 3 wherein a light emitting diode or other narrow band light source Y120 produces a band of light for example in the infrared region. In this case, wavelength Y50 or Y60 may be of the order of Y910 manometers, and light sensors Y131 and Y132 may be particularly sensitive at this wavelength. According to the example of FIG. 2, filters Y141 and Y142 have passbands as indicated at Y51 and Y52 respectively, while according to the example of FIG. 3, the filters Y141 and Y142 have overlapping wideband characteristics as indicated at Y61 and Y62. In each case, the outputs of the light sensors Y131 and Y132 may be supplied to differential amplifier means such as Y130B, FIG. 6, so as to provide a resultant output especially sensitive to a bar code scanned thereby even in the presence of ambient daylight illumination.

In one embodiment according to FIG. 7, light is transmitted from light source Y120 to a light port Y144 via optical fibers Y145, and reflected light is transmitted via respective optical fibers such as indicated at Y146 and Y147 which terminate at a small-area central region of light port Y144. By way of example, the reflected light transmitting fibers such as Y146 and Y147 may be essentially uniformly distributed at the port Y144 over a central circular area which is small in comparison to the size of a minimum width bar of a bar code to be scanned, so that ambient light has less effect on resolution than where the size of the incident light spot is relied upon to define scanning resolution.

Where lenses are utilized, the reflected light is preferably collected by symmetrically arranged lenses focused at a common reflected light pickup region at the bar code for high resolution scanning of the bar code. (The pickup region may have a small diameter in comparison to a minimum bar dimension.) Preferably in this case also equal amounts of reflected light are transmitted to respective photodetectors such a Y131, Y141 and Y132, Y142. Again it is preferred that the reflected light optics provide the required resolution independently of the size of the incident light spot from the light source such as Y120 so that resolution is less affected by the presence of intense ambient light.

Preferably in each case the response characteristics of the detectors with respect to reflected light are so matched that the first and second light sensors such as Y131 and Y132 provide essentially equal signals when the light source Y120 is not energized and the light port Y144 is held against the bar code, for each incremental position of port Y144 along the length of the bar code, even in the presence of sunlight.

Light source Y120 may be a conventional light source for a wand type scanner such as a light emitting diode, or may be a laser light source.

It will be apparent that many modifications and variations may be effected without departing form the scope of the novel concepts and teachings of the present invention.

a. Description of FIG. 13

FIG. 23 is a diagrammatic view showing a target region for an instant bar code scanner such as a moving beam laser scanner, wherein a visible laser diode of the scanner is pulsed in synchronism with beam deflection to generate one or more visible markers in a marker beam mode.

A laser bar code scanner as shown in FIGS. 1–7 may generate marker spots such as shown at Y13-41, Y13-42. Laser beam scanners conventionally generate a start of scan rectangular waveform as a function of scan motor operation. The start of scan waveform corresponding to X-axis deflection can be used to momentarily turn on a visible laser diode source at the beginning and end of each high rate (X-axis) scan to product marker spots Y13-41 and Y13-42.

In marker beam mode it is preferred that the electronics associated with the photodetector, e.g., as indicated in FIG. 6 be deenergized, e.g., to conserve battery power where the scanner is battery powered. A momentary push button switch (such as indicated at 68 in U.S. pat. No. 4,251,798) or the conventional trigger of pistol shaped visible laser diode scanners may produce a logical signal (e.g. zero volts or ground potential) when actuated, which signals for marker beam mode. In an initial mode before actuation of the manually operated actuator, the scanner may be deenergized. Operation of the manual actuator may establish marker beam mode for as long as the actuator is held in operated condition. In marker beam mode, the scanner mechanism is operated at a suitable rate, e.g. 36 scans per second. For scanning at distances over two feet, the rotary drive could operate at two scans per second to give brighter marker spots. The rotational speed could be slow at the beam turn-on marker intervals, and faster between marker intervals.

Where the scanner is vehicle mounted, or mounted on a manually propelled wheeled device for example, the number of horizontal lines in the scanning raster may be increased, e.g., to 240 or more. Where a complete raster is scanned quickly, or where the scanner may be otherwise held steady during scanning, an area array matrix type photosensor of may be used with a laser beam raster scanner. The laser beam may in such case be of oblong cross section with a Y-axis dimension of, e.g., six mils (0.006 inch) so as to cover a given height of raster with fewer horizontal scan lines. The raster may comprise interlaced fields of horizontal scan lines with the first field beginning with a top horizontal line and the second field beginning with a lowermost horizontal scan line. The brightness of the scanning beam may be controlled during scanning so as to compensate for any lack of uniformity in the sensed intensity of the image over the photosensor area, e.g., due to elapsed time between scanning of different image regions and varying label distance (e.g. due to curvature or the like). A convenient way to modulate light intensity from the laser diode is to supply a high frequency pulse train to energize the laser diode in a frequency range far above the highest information rate, and to vary such high frequency to compensate for nonuniformities (detected, e.g. by intensity sensors such as Y50, Y51, Y52, FIG. 2 located, e.g., to receive reflected light during a first horizontal scan line above the bar code information where the sensors are activated at the marker beam intervals, and then outputs stored digitally and compared).

A scanner such as shown in U.S. Pat. No. 4,251,798 may have a matrix type photosensor and optical system located generally in the filter and photodetector region (58,60, FIG. 2 of U.S. Pat. No. 4,251,798). By using a laser diode source, the housing may be more compact, A Where the scanner is to operate according to FIGS. 1–7, for example, the intensity of the marker spots such as Y13-41 to Y13-42 may be adjusted in marker beam mode by actuating one of a series of intensity selection keys located on a keyboard (such as 24, sixth figure, U.S. Pat No. 4,251,798 or at Y11A, Y11B, FIGS. 32–33). The intensity selection keys may progressively increase the energizing frequency for the visible laser diode (such as Y20, FIG. 1 hereof, or Y90, FIG. 5 hereof).

When the actuator is released to shift from marker beam mode to symbol reading mode, the same energizing frequency may be used for the visible laser diode as was selected in marker beam mode. Thus, the laser beam will be relatively more intense in symbol reading mode where the distance to the bar code is relatively great and/or where the ambient illumination is relatively intense.

In a preferred symbol reading mode, the scanner does not revert to initial mode automatically when a single bar code line has been successfully read. In one example with a single line bar code scanner, the scanner may be manually displaced to read a stacked bar code. In this example, a beeper or other indicator will indicated a successful reading of a first line of the stacked bar code whereupon the scanner remains in symbol reading mode and the operator may manually tilt the scanner to read further lines of the stacked bar code. If desired upon each successful read, the marker spots, e.g., Y13-41 and Y13-42 for a single line scanner may be flashed after each reading of the same bar code line (e.g. with the photodetector electronics deenergized during such flashing) so as to indicated to the operator that the scanner is reading the same line and ignoring (not storing) the result of such reading. For example, if the scanner mirror has ten facets and is rotated at ten revolutions per second, and if after a successful read of a line the scanner performs nine scans with no new bar code number being read, on the tenth scan the photodetector electronics would be automatically deenergized and the marker spots Y13-41 and Y13-42 flashed. The system would then execute nine further scans with the photodetector system activated. If the further scans revealed a non-bar-code-reading condition consistent with scans occurring between bar code lines, the tenth and further scans could all be with the photodetector active. After, for example, ten consecutive non-bar-code scans, the scanner might accept a bar code reading of the same value as the last reading accepted, (the operator being informed to avoid returning to a previous read label unless such label was to be read and entered a second time).

Where the bar code scanner is progressively tilted to read a series of bar code lines, a beep or other indication will occur each time a new bar code value is registered. After a suitable number of such beeps, e.g. five, the system may be returned to initial condition, e.g. by a rapid manual operation and release of the manual actuator, or the actuator may be operated, e.g. to disable the photodetector electronics and return to marker beam mode to assist in aiming at a new symbol to be read, while conserving in power supplied to the visible laser diode and avoiding unnecessary power consumption by the photodetector electronics.

Figure 13:
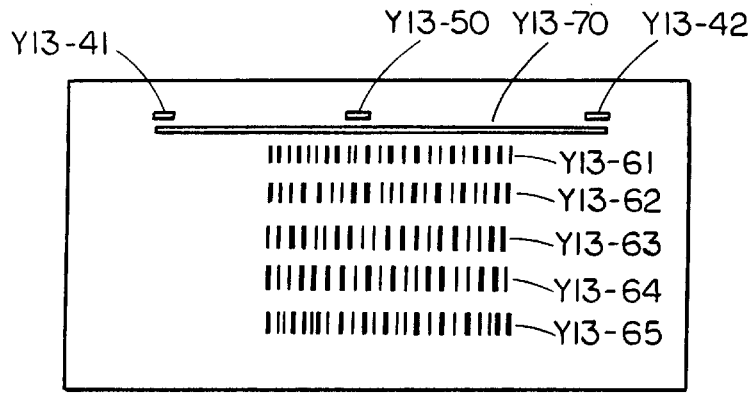
FIG. 13 is a diagrammatic illustration of a stacked bar code which may be read by the illustrated embodiments.

Where, for example, the scanner is supported by a sliding friction type universal mount while being manually aimed, a key may be actuated to produce only a single, e.g. central marker spot such as Y13-50, FIG. 13. (This is somewhat analogous to the static PSC mode, col. 12 of U.S. Pat No. 4,251,798, except that preferably in the present embodiment the scanner motor is operating at a desired speed, and the visible laser diode is flashed for, e.g., ten percent of each scan interval at the mid region of each start of scan half cycle). While the central marker spot Y13-50 is on the background color of the bar code, e.g. just above the bar code, the marker spot may be adjusted to a suitable intensity by manual selection from a group of marker beam intensity selection keys, or the photodetector may be momentarily switched on by a separate control key to automatically adjust the energizing frequency of the visible laser diode for proper reading operation. For example, a microprocessor used for decoding may have a program for automatically effecting energizing frequency adjustment to provide a suitable photodetector output when the control key is momentarily operated to cause the marker beam to generate a central marker beam spot. The procedure could be carried further by having left and right marker beam spots as well as a central one, the control program determining proper minimum laser diode energizing frequency suitable to the three marker spot locations, or if desired determining a suitable variation of laser diode energizing frequency as a function of beam displacement to maintain essentially uniform illumination of the bar code during a subsequent symbol reading operation. As an alternative, when the actuator is released from marker beam activating position, it may be assumed that the marker spots are aimed at background, and in a first cycle with the visible laser diode energized for a complete scan (or momentarily held in three marker spot mode) the photodetector is turned on and the control program progressively adjusts laser diode energizing frequency until a suitable frequency level or frequency variation pattern is set, whereupon the decoding program is enabled, and the user may progressively scan a series of bar codes with similar background and distance from the scanner.

After completion of scanning of such a group of bar codes and return to initial mode, the adjustment procedure may be automatically repeated each time the actuator is operated to marker beam mode, and then released to symbol decode mode. At each turn off of the scanner, e.g., by quick-actuation-and-release of the actuator, the scanner may be restored to an initial condition such that any new operation of the actuator will result in a selected average energizing frequency for the laser diode energization being reestablished.

b. Summary Description of One Exemplary Embodiment According to FIG. 13

Because of the relatively low power consumed in marker beam mode, it is contemplated that a battery powered scanner may be detachably coupled to a belt-carried sliding friction type universal support, with operation essentially corresponding to that with the universal support mounted on a vehicle, e.g. a forklift truck. In each case a pistol-sharped scanner, e.g., of the single line scanning type can be aimed by manipulation of the scanner handle while observing the corresponding movement of the marker spots. With the marker spots such as Y13-41, and Y13-42 on the symbol background above the symbol, the manual actuator may be released to initiate an automatic adjustment of visible laser diode energizing frequency, the decode microprocessor and photodetector electronics being energized at this time. Once the photodetector is receiving adequate reflected light intensity from each of the marker spots such as Y13-41, and Y13-42, FIG. 13, the scanner automatically switches to symbol decoding mode and the user will see a complete scan line, e.g. Y13-70. Thereupon the user gradually tilts the scanner to successively scan a series of bar code lines, e.g., of a stacked bar code symbol or other two dimensional optically readable information set. As each line (or portion) is successfully decoded, the scanner may emit a single beep. When the user has heard, e.g., five beeps, the actuator may be quickly operated and released to restore the scanner to initial deenergized mode and to reset visible laser diode energizing frequency so that it will be at a desired initial marker beam value when the scanner is again actuated to scanner beam mode. By way of example the initial marker beam frequency may be intermediate the available maximum and minimum values, and may be adjusted by a series of selection keys as previously described. In this way the need for automatic adjustment of laser diode energizing frequency at the beginning of symbol scanning mode is reduced or even eliminated.

Normally in this embodiment, the number of laser diode energizing frequencies need not be large since a major purpose in not using the maximum safe frequency at all times is to conserve battery power. Another objective of adjusting the laser diode energizing frequency would be to avoid saturation effects when reading close-in bar code symbols. Battery power may be coupled to the scanner through the belt mount therefor where the battery pack is supported on the belt, for example. The scanner may contain its own battery pack, e.g. in the handle, where it is to be operated detached from the belt mount in a completely hand-supported mode.

As previously described, in symbol decoding mode, a single beep is sounded for each new bar code value which is read and stored. A given value is stored only once unless there is a selected number of non-bar-code scans (e.g. ten) intervening between the last close-following reading of the given value, and the new reading of such value. The same value is registered again also whenever a different value or values are registered during intervening readings. If the scanner is left in symbol reading mode, provision may be made for returning to initial mode, if a selected number of scans are non-bar-code scans (e.g. result from the scanner being pointed at the floor or some other non-reflective or uniformly reflective target area). The scanner may also return to initial mode if the actuator is not actuated e.g. for twenty seconds regardless of how recently the scanner has registered a valid bar code reading since normally only five or so readings would be made during a given symbol reading operation. Where belt-mounted, the scanner can be automatically reset to initial mode when the belt is opened to remove it from the wearer. On a vehicle, the scanner can be deenergized when the vehicle ignition switch is off. The coupling between a scanner and a universal mount may include an automatic coupling of the scanner to a set of contacts-analogous to automatic couplings as disclosed e.g. in FIG. 11 and FIG. 14, for transmitting charging current, data signals and the like.

c. Description of FIGS. 8–11

As an example, the single line laser bar code scanner of U.S. Pat. No. 4,820,911 may be operated according to FIG. 8. This patent may be modified to utilize the teaching of FIGS. 1–7 by inserting a beam splitter Y801 in place of a band pass filter (59, second figure of U.S. Pat. No. 4,820,911), with filters Y802 and Y803 and photodetector Y804. The filters Y802 and Y802 may be either low pass, high pass, or band pass as discussed with reference to FIGS. 1–7. In this example photodetector Y804 would be matched with photodetector Y8-52 for optimum cancellation of the signal component due to ambient illumination.

As another example, the mirror facets such as Y8-24 could be of dual slope, the position of Y8-34 being adjusted downward, e.g., by a beam diameter to maintain a horizontal output beam axis just below center axis Y805. Then a collector corresponding to Y8-54, Y8-52 could be arranged above the horizontal exit beam path Y805 and associated with filter Y803 and photodetector Y804, the beam splitter Y801 being omitted.

d. Description of FIGS. 9, 10, and 11

Figure 9:
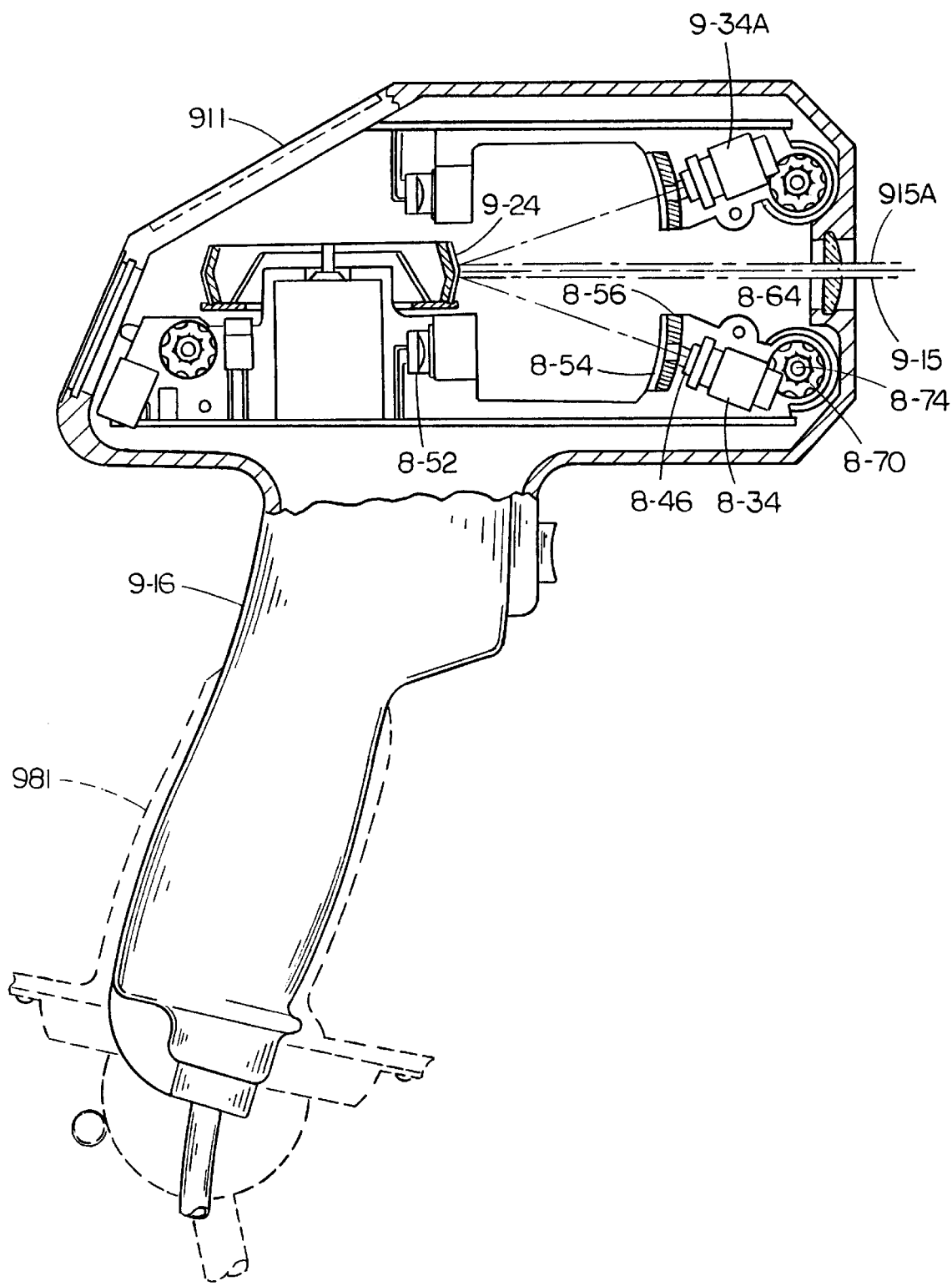
FIG. 9 is a longitudinal sectional view corresponding to FIG. 8, but indicating a duplication of parts as a mirror image with respect to a horizontal plane so that teachings according to the present invention may be applied, and for example, the beam splitter of FIG. 8 omitted.

FIG. 9 shows such a mirror Y9-24 with a second visible laser diode Y9-34A of the same wavelength (or a different wavelength where beam splitters and two pairs of filters and photodetectors are used). The second visible laser diode is mounted in an upper section of the housing and its associated components are shown arranged as a mirror image of the lower components Y8-34, Y846, Y8-54, Y8-56, Y8-64, Y8-70, Y8-74.

The laser diodes Y8-34 and Y9-34A, FIG. 9, could be operated simultaneously in a variable frequency energizing mode, the two output beams Y9-15 and Y9-15A being offset e.g. vertically to provide a double simultaneous scan line for example. The beams could have different configurations, e.g. circular and elliptical, and be activated during respective alternate scans, or the beams could be selectively activated individually, jointly, or alternately by means of manual key selection.

Where the scanner of FIG. 9 is equipped with symbol distance measurement means, e.g. actuated by a key when the marker spots from beam Y9-15 and/or Y9-15A are aligned with a bar code line (or using e.g. one marker beam such as Y9-15 in marker mode), the distance measurement may be used to select which beam to activate, or whether to activate both beams for proximity detect mode.

Figure 10:
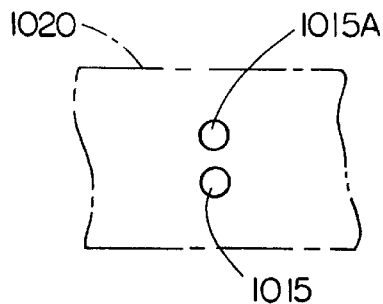
FIG. 10 shows an exemplary beam pattern at the reference plane for the embodiment of FIG. 9.

FIG. 10 shows the beam pattern comprising beam spots Y1015 and Y1015A at a reference plane indicated at Y1020 for the case of two circular beams of equal diameter separated by a center to center distance approximately equal to beam diameter. With this embodiment one half-power beam could be used for close-in scanning, and an automatic distance measurement could control selection of one or two half-power beams (e.g. in a default operating status) for symbol decoding mode and/or proximity detect mode. The distance measurement could be based on time between marginal marker spots in comparison to bar code line width.

Figure 11:
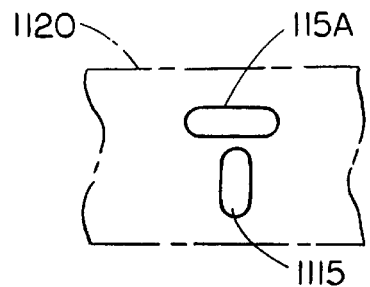
FIG. 11 shows a different exemplary beam pattern for FIG. 9.

It is also conceivable that the beams would produce respective spots Y1115, Y115A as shown in FIG. 11 at a reference plane such as indicated at Y1120. Here again switching between the beams could be based on a distance measurement where dense bar codes are generally in a close up range, and coarser bar codes are generally to be read at greater distances. Where half-power laser diodes are used, both the beams of FIG. 11 could be on simultaneously at relatively great throw distances at least during alternate scans or the like.

As another example, the reflector Y8-54 may be mounted external to housing Y8-10, for example above the housing and facing generally frontally (and without a center aperture), the parts Y801-Y804 and Y8-52 being mounted external to the housing and forwardly of the external reflector to receive reflected light for each successive beam position along a bar code. Where reflectors such as Y8-54 are positioned externally, above and below housing Y8-10, elements Y8-52, Y802 may be forwardly of one reflector and above the housing, while components Y803, Y804 may be located below the housing and forwardly of a second reflector. The reflectors and associated photodetector assemblies may be mounted on an adapter which fits over the front of the housing Y8-10 without obstructing window Y8-48.

e. Description of FIG. 12

Figure 8:
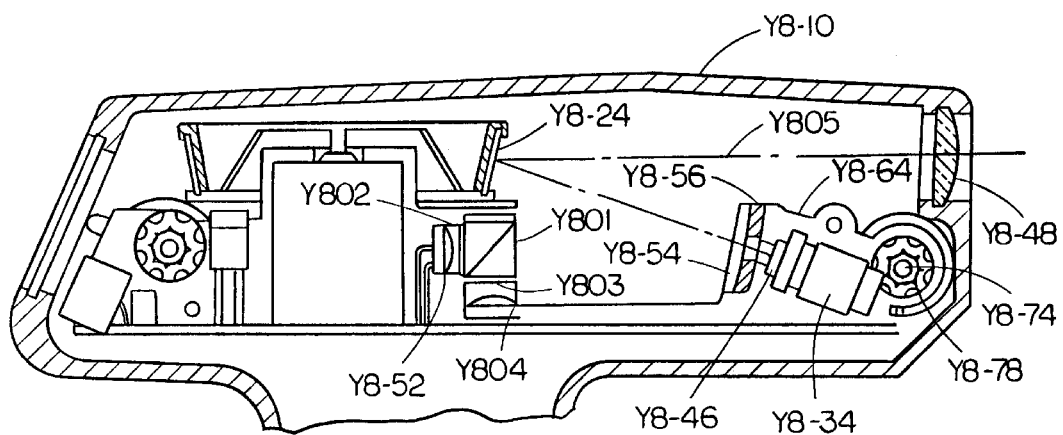
FIG. 8 is a longitudinal sectional view taken from the second figure of U.S. Pat. No. 4,820,911 issued Apr. 11, 1989, and showing a modification thereof so as to practice teachings in accordance with the present invention.
Figure 12:
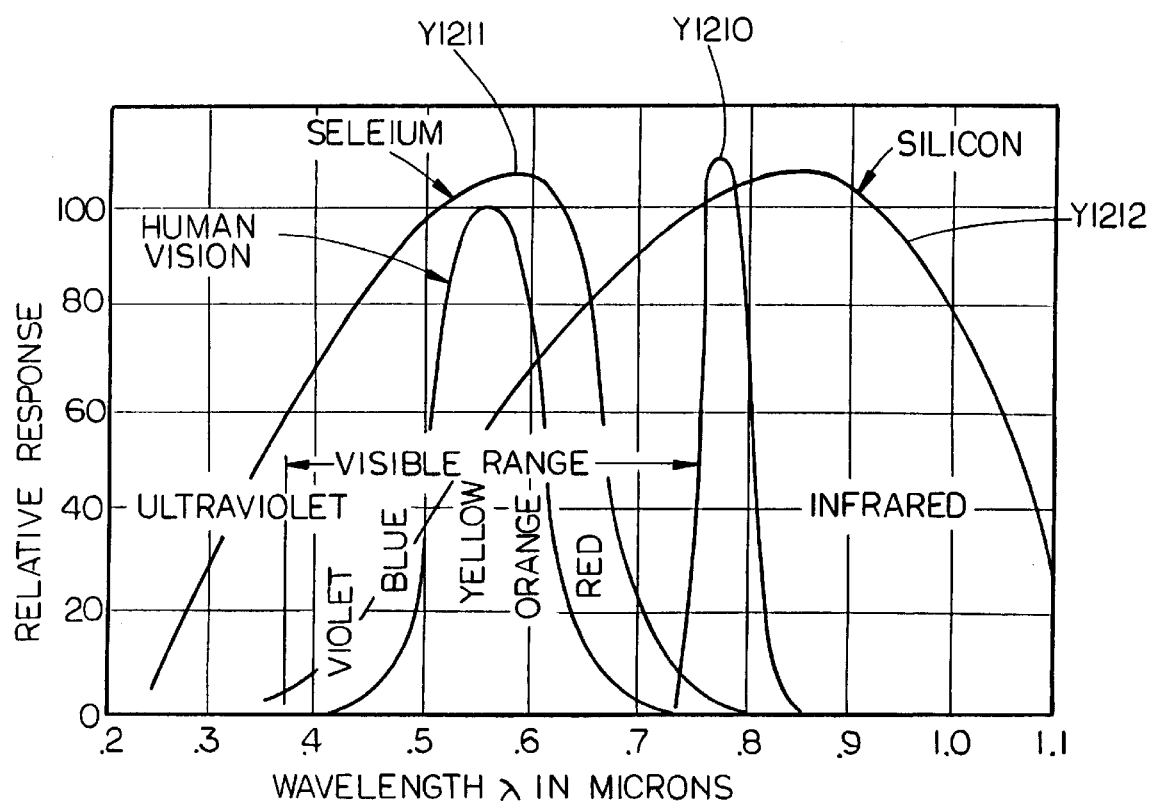
FIG. 12 shows the relative spectral response of selenium and silicon photo-voltaic materials, and inserts in the plot an exemplary light source output spectrum in the infrared region to which selenium and silicon photocells would be differentially sensitive, e.g. without the use of filters, and in addition to conventional narrow pass filters centered at the laser diode wavelength.

In FIG. 12, the output spectrum for a laser diode, e.g. in the infrared region, is indicated at Y1210. Curve Y1211 indicates the relative spectral response of a selenium photovoltaic material while curve Y1212 is for a silicon photovoltaic material. In FIG. 8 or FIG. 9, it is possible that the filters such as Y802, Y803 could be omitted where the photodetectors Y8-52 and Y804 had respective spectral response characteristics as represented at Y1211 and Y1212. A similar result would be possible for a visible laser diode Y8-34 operating at a wavelength of about 0.5 microns (500 nanometers).

Such an approach would also be applicable to the embodiments of FIGS. 1–6, again suggesting that filters such as Y41, Y42, etc. may not be essential to obtaining a substantial degree of ambient light compensation.

f. Exemplary Operation of the Embodiments of FIGS. 8–13

In a mode of operation of the embodiment of FIG. 8 or FIG. 9, alternate scans during reading operation may take place with the laser diode deenergized. The output of the photodetector system such as Y8-52, Y801-Y804 (or 52, 59, in the second figure of U.S. Pat. No. 4,820,911) may be sampled e.g. at a rate many times greater than the maximum information rate, and the result stored for use in modulating the intensity of the laser beam during the next scan so as to tend to compensate further vertical reticle line Y14-21 which is vertical when the laser beam is scanning in a perfectly horizontal plane. It is thus apparent to the user if the beam is not scanning along a path perpendicular to the bars of the bar code. Where the scanner handle is guided by a receiving sheath such as Y981 may be mechanically guided by a universal mount on a fixed support (e.g. a forklift); then it is a simple matter for the user gripping the handle Y9-16 and sheath Y981 to adjust the scanner so reticle Y14-Y21 is essentially parallel to the bars of the bar code. A center marker spot Y13-50 between spots Y13-41, Y3-42, would facilitate visualization of the central part of the bar code through view window Y14-20.

Figure 14:
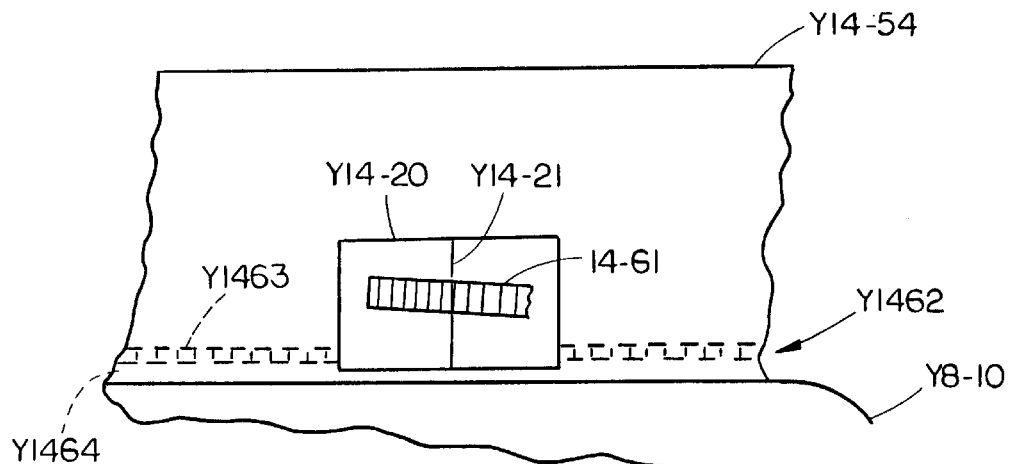
FIG. 14 is a diagrammatic partial rear elevational view showing a scanner with an external reflected light collector.

FIG. 14 indicates the use of a linear array Y1462 of photodiode elements Y1463 in front of a straight optical collector Y14-54 (by way of example). A printed circuit board Y1464 may carry the array or arrays and conduct the parallel outputs to suitable processing circuitry such as described with reference to FIGS. 15 and 16. For a uniformly straight reflector configuration (e.g. as represented at 76 in the third figure of incorporated U.S. Ser. No. 07/422, 052, with the sensor arrays extending along the axes of elements 35, 36, the second figure), the reflector may comprise two or more straight sections (analogous to elements 35, 36 the second figure of U.S. Ser. No. 07/422,052), with cooperating straight line array sections such as 1462. Each reflector is preferably shaped for optimum efficiency at the maximum range of the scanner.

g. Description of the Embodiment of FIGS. 15 and 16

Figure 16:
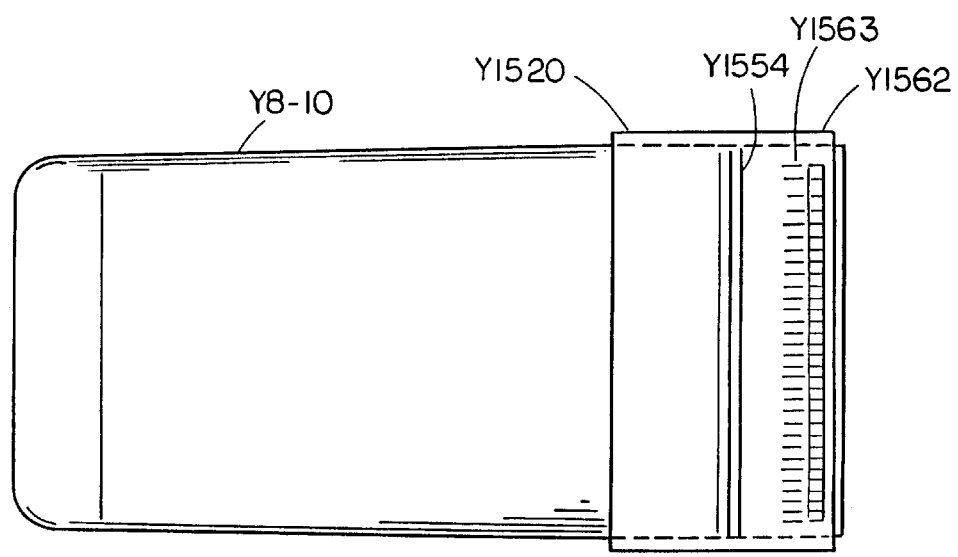
FIG. 16 is a somewhat diagrammatic horizontal sectional view of the structure of FIG. 15 for illustrating certain details of the external photodetector assembly.
Figure 15:
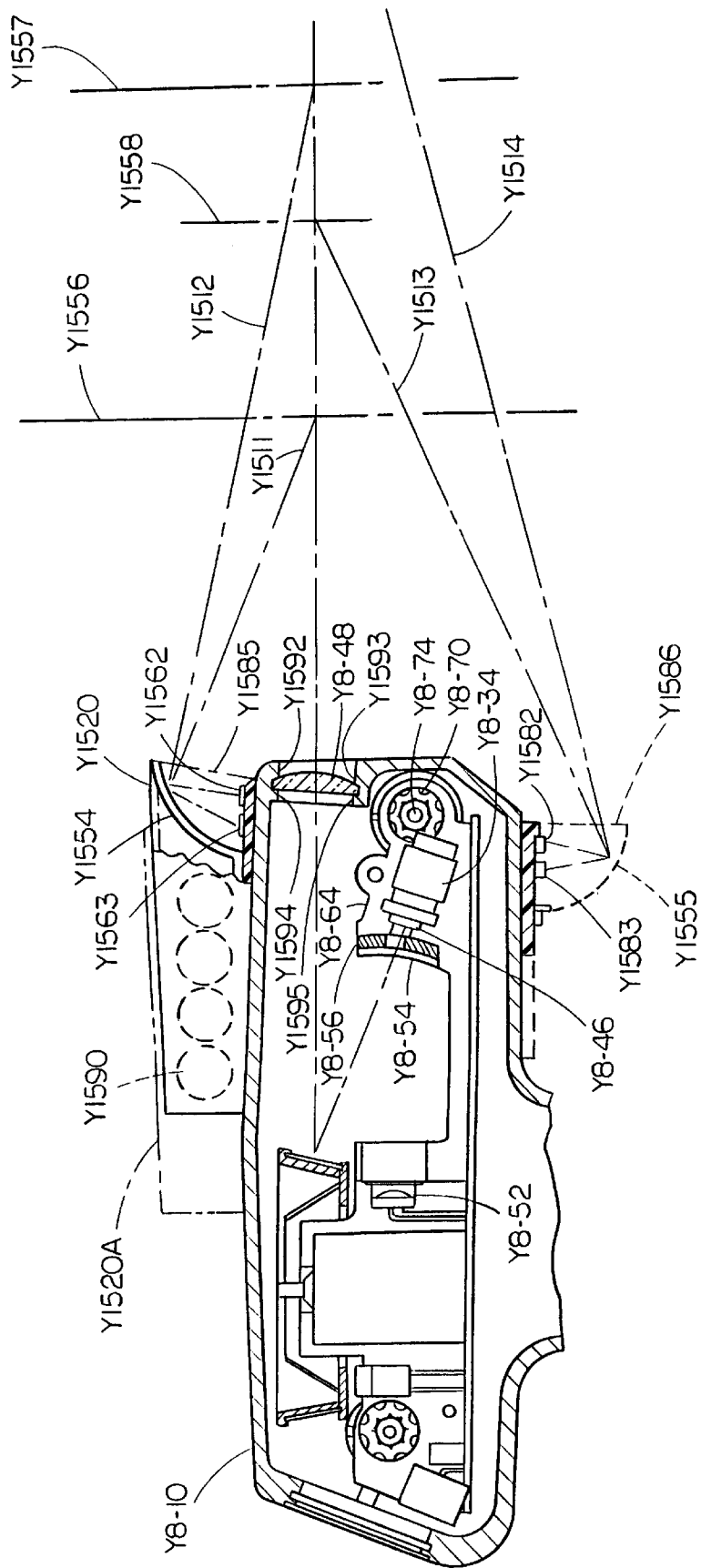
FIG. 15 is a somewhat diagrammatic patrial longitudinal sectional view of the scanner of FIG. 8, with a slip-on external photodetector assembly applied to the frontal barrel portion of the scanner housing.

FIG. 15 is a partial longitudinal sectional view of the scanner of FIG. 8, with a slip-on external photodetector assembly Y1520 applied to the frontal barrel portion of housing Y8-10. FIG. 16 is somewhat diagrammatic horizontal sectional view for illustrating details of the external photodetector assembly Y1520 of FIG. 15 and cooperative parts of the scanner of FIG. 8.

In FIG. 15, upper and lower straight continuous reflected light collectors Y1554 and Y1555 are shown, collector Y1554 being designed to focus reflected light from a near reference plane Y1556 at a photodiode array Y1562 which may correspond identically with array Y1462. Array Y1562 may have a width corresponding to housing Y8-10, e.g. about three inches. Reference numeral Y1511 designates a ray of reflected laser light reflected from a small illuminated spot on a bar code at the near reference plane Y1556.

At a further reference plane Y1557, e.g. representing an optimum plane with respect to scanning of a less dense bar code a reflected light ray Y1512 at the laser wavelength may impinge on a second photodetector array Y1563. A reflected light ray Y1513 from a bar code at an intermediate location indicated at Y1558 is shown as impinging on a further photodiode array Y1582, while a ray Y1514 reflected from a bar code at a farther location is shown as impinging on a further photodiode array Y1583.

The entrances to reflectors Y1554 and Y1555 may be suitably covered by material transparent to the laser wavelength as indicated at Y1585, Y1586. The methods previously described may be used in addition to bandpass filters at Y1585, Y1586, or in places thereof. Thus the arrays Y1562, Y1563, and Y1582, Y1583 may be covered by respective filters as represented in FIG. 2 or FIG. 3, so that the respective differential outputs from the upper and lower photodetector arrays each tends to minimize the effect of ambient light.

Battery power Y1590 can be coupled to the scanner from the subassembly Y1520 via external contact bars embedded in housing Y8-10 and cooperating spring fingers analogous to the fingers (632, seventeenth figure or 801, twenty-fifth figure of incorporated U.S. Ser. No. 07/347,602). In this case, photodetector output signals from detectors Y1562, Y1563, Y1582, Y1583 could also be coupled via such spring fingers and housing contracts to the interior of the scanner.

In this case, the subassembly Y1520 can use its own battery power, e.g. as indicted at Y1590 for supplying power to differential amplifiers and photodetectors for arrays Y1562, Y1563 and Y1582, Y1583. As another example, the difference signals can be converted to optical form e.g. at Y1592, Y1593 for transmission through the margins of window Y8-48 to respective receives Y1594, Y1595.

A battery pack may be used for Y1590 as described in Steven E. Koenck application for patent "Battery Including Electronic Power Saver" U.S. Ser. No. 07/433,076 filed Nov. 7, 1989, Attorney Docket No. 6881.

The assembly Y1520 may be longitudinally adjustable on the barrel of housing Y8-10, a second position of assembly Y1520 being indicated in dot dash outline at Y1520A. The external contact bars embedded in housing Y8-10 may be elongated to maintain engagement with the cooperating spring fingers of assembly Y1520 in the various adjusted positions.

In the embodiment of FIG. 8, a single detector Y8-52 may be used with a rotating filter disk serving to interpose filters such as Y802 and Y803 sequentially and cyclically into the reflected light path at a rate higher than the maximum information rate. The differential between respective pairs of output signals generated by the respective types of filters may be generated, e.g., by a sample-and-hold-circuit for holding a first occurring sample, so that the delayed first signal and a second occurring signal can be supplied simultaneously to a differential amplifier. The output of the differential amplifier can then be sampled during the second signal to generate a sampled bar code output signal compensated for ambient light.

h. Discussion of a Presently Preferred Scanner System with Proximity Detection

The general prior art for actuation of most CCD and laser scanners has required the use of an actuation switch or trigger to initiate operation of the scanner. This method has been used by Norand Corporation for CCD type scanners as shown by incorporated U.S. Pat. No. 4,894,523. See also U.S. Pat. No. 4,282,425 (filed Jul. 25, 1979 and also disclosing proximity detection). Such prior art scanners depend on the operator pulling the trigger or depressing the actuation switch at the correct time, presumably when the reader is correctly positioned in front of the label. If this is the case, the reader will be activated, perform the read and automatically terminate operation quickly and efficiently and subsequently shut down to conserve power. In the case of moving beam laser scanners, it is probably more likely that the operator will press or activate the trigger to generate the reassuring "red stripe" or line and then position the reader so that the "red stripe" reading beam crosses all of the bars for a proper read. When the laser scanner is used in this way, obviously significant power is wasted operating the laser and the motor when no target is available.

It is possible to make an improvement to trigger actuated scanners by adding an electronic proximity sensor to be used either with or without a trigger switch. The idea is to use a sensor that detects the presence of something (such as a label) before the scanner is actuated. If this is used with a trigger operated scanner, the concept would be to actuate the sensor with the trigger switch, and as soon as the sensor detects the presence of a label, the scanner runs. If this is used with a scanner with no trigger, simply placing the reader in front of a label so that the sensor gets the proper indication will cause the scanner to operate. The trigger operated version would be the most power efficient and probably work best because it would include a double indication that reading should occur.

Given some combination of a trigger and a proximity sensor where the trigger causes the proximity sensor to begin operating and the successful sensing by the proximity sensor of a target label causes the scanner to operate, it may be possible to further improve the power efficiency of a scanner such s a moving beam laser type.

i. Supplemental Discussion

Instead of using two detector-filter systems as in FIGS. 8 and 9, it is conceived that a single detector may be used if the light supplied to such single detector from the scan mirror system is alternately that represented by the respective curves Y51, Y52 in FIG. 2, or Y61, Y62, FIG. 3. Thus, with a rotary scan mirror with a plurality of facets as represented at Y91, FIG. 5, or Y8-24, FIG. 8, alternate faces of the scan mirror could be optically coated to reflect the respective bands such as Y51, Y52 or Y61, Y62. The electronics associated with the single detector would then digitally sample and store one scan line and differentially combine it with the corresponding successive samples of the next scan line (e.g. also converted to digital samples) to compensate for ambient light. With this arrangement in FIG. 9, single detector Y8-52 could operate in this manner while beam Y9-15A was off, for example, or each detector of FIG. 9, could operate individually to compensate for ambient light in its particular field of view.

Alternately, it might be possible to coat, e.g., the upper half of each mirror face Y8-21 24, FIG. 8, and to utilize two detectors one above the other for receiving reflected light from the coated and uncoated halves of each mirror, respectively. This could also work with an oscillating mirror collecting reflected light.

It is also conceivable to use rotary facets which are transmissive as to one band of wavelengths such as Y52 and reflective as to another band such as Y50, with one sensor behind the active facet position, and a second sensor in front of such facet position.

It will be apparent that many modifications and variations may be effected without departing from the scope of the novel concepts and teachings of the present invention.

We claim:

1. A system for reading optically readable information sets, comprising:
   (a) a scanner for generating a light beam directed toward an optically readable information set;
   (b) a manually-operable actuator including a controller for operatively controlling the scanner such that said scanner may be selectively optimized to read optically readable information sets over a wide range of distances; and
   (c) a detector for receiving reflected light from said optically readable information set to produce electrical means corresponding to data represented by such symbol.

2. The system according to claim 1, further comprising a housing having a handle for hand-held operation, and wherein the scanner and detector are disposed in the housing and the manually-operable actuator on the housing.

3. The system according to claim 2, herein the actuator includes a trigger operatively connected to the scanner to select between at least two distances within the operational range of said system.

4. The system according to claim 3, wherein the scanner includes a movable scan element operative for sweeping the light beam across the optically readable information set, and wherein the controller repetitively scans the scan element along arcs of limited angular distance, in a first operational state, and repetitively scans the scan element along arcs of predetermined angular distance greater than said limited angular distances in a second operational state, said states corresponding to said selectable positions of said control means.

5. The system according to claim 1, wherein said scanner comprises at least two distinct light sources for emitting at least two distinct light beams, each of said light beams being focussed such that each light source has a different working range at different distances from the light source.

* * * * *